(12) United States Patent
Carnevali

(10) Patent No.: US 9,309,687 B2
(45) Date of Patent: Apr. 12, 2016

(54) SUPPORT LEG

(76) Inventor: Jeffrey D. Carnevali, Seattle, WA (US)

(*) Notice: Subject to any disclaimer, the term of this patent is extended or adjusted under 35 U.S.C. 154(b) by 0 days.

(21) Appl. No.: 12/459,412

(22) Filed: Jun. 30, 2009

(65) Prior Publication Data

US 2010/0327128 A1  Dec. 30, 2010

Related U.S. Application Data

(63) Continuation-in-part of application No. 10/802,408, filed on Mar. 17, 2004, now Pat. No. 7,959,116.

(51) Int. Cl.
| | | |
|---|---|---|
| *A47F 5/00* | (2006.01) | |
| *E04H 12/20* | (2006.01) | |
| *E04H 12/22* | (2006.01) | |
| *F16M 13/02* | (2006.01) | |
| *F16M 11/04* | (2006.01) | |

(52) U.S. Cl.
CPC ............... *E04H 12/20* (2013.01); *E04H 12/22* (2013.01); *F16M 11/04* (2013.01); *F16M 13/02* (2013.01)

(58) Field of Classification Search
CPC ..... F16M 13/02; F16M 11/04; A47B 95/008; F21V 21/02; E04H 12/20; E04H 12/22
USPC ........ 248/230.1, 218.4, 160, 411, 121, 122.1, 248/180.1, 225.11; 403/220, 223
See application file for complete search history.

(56) References Cited

U.S. PATENT DOCUMENTS

| | | | | |
|---|---|---|---|---|
| 5,699,988 A | * | 12/1997 | Boettger | ................... A61G 5/10 248/122.1 |
| 7,320,450 B2 | * | 1/2008 | Carnevali | ............... F16M 11/40 248/121 |
| 8,282,052 B2 | * | 10/2012 | Huang | ................. F16M 11/045 248/125.1 |
| 2002/0089851 A1 | * | 7/2002 | Jamison | ................... F21V 21/30 362/287 |
| 2005/0092876 A1 | * | 5/2005 | Carnevali | ............... F16M 11/40 248/160 |
| 2008/0148992 A1 | * | 6/2008 | Bambrick | ............... B61C 13/04 105/30 |

* cited by examiner

*Primary Examiner* — Todd M Epps
(74) *Attorney, Agent, or Firm* — Charles J. Rupnick

(57) ABSTRACT

A support apparatus includes a permanently bendable support rod having one of a pair of anchors secured to each end, and a pair of fasteners that cooperate with the anchors for connecting the support rod between an external structure, such as but not limited to a free standing pole or post, and an adjacent fixed structure such as a floor or wall. Each anchor is formed of a substantially rigid foot having inner and outer arced surfaces, an aperture formed through the foot, and a rod connector structured for securing the anchor to one end of the support rod. The pair of fasteners are each operable through the aperture of the foot of one of the anchors.

21 Claims, 10 Drawing Sheets

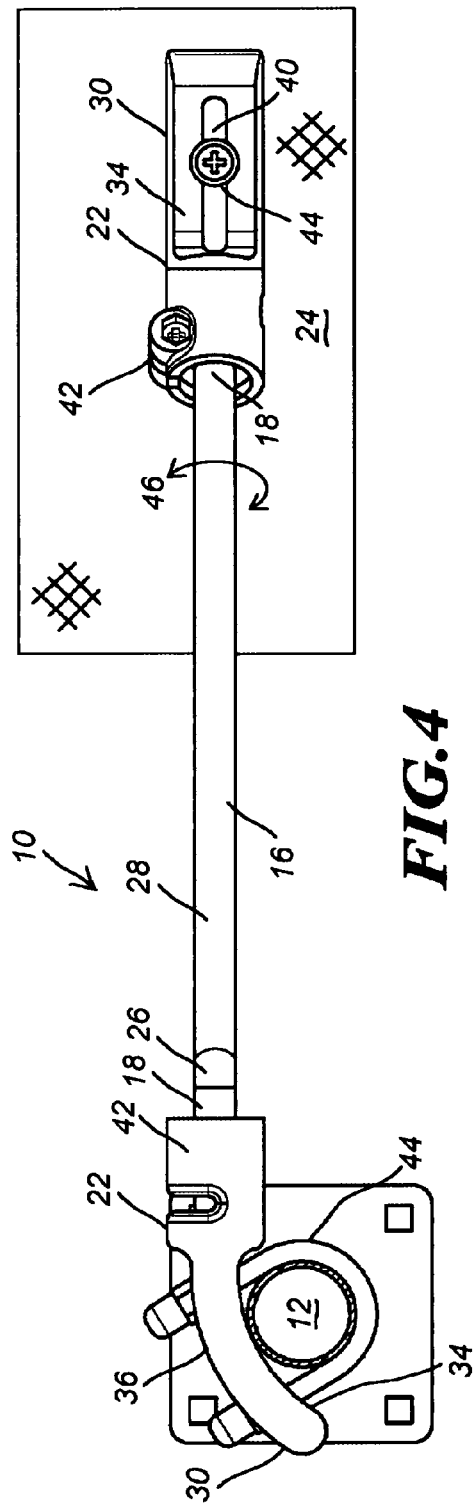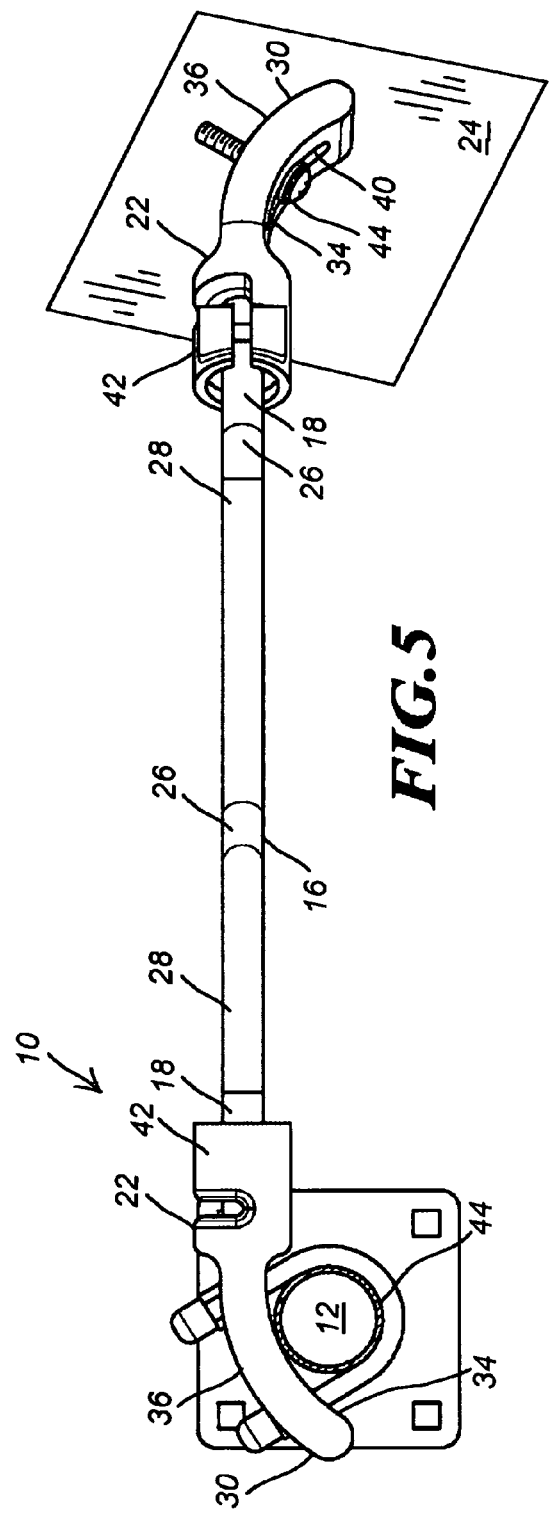

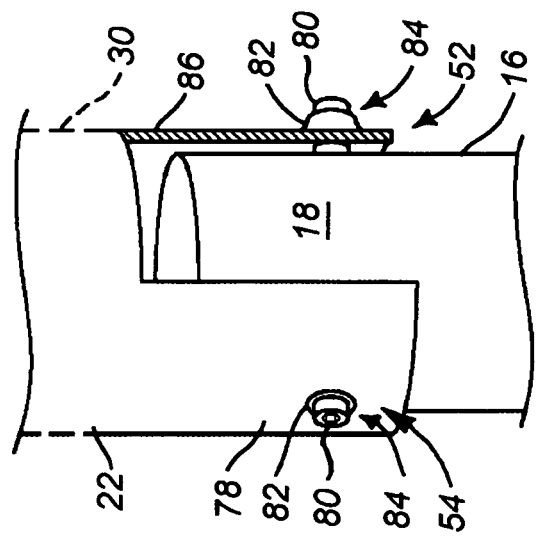
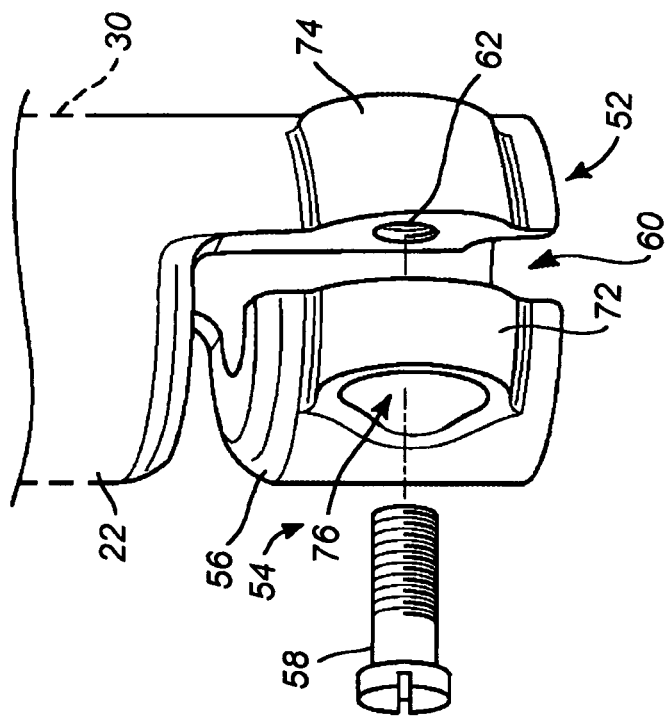

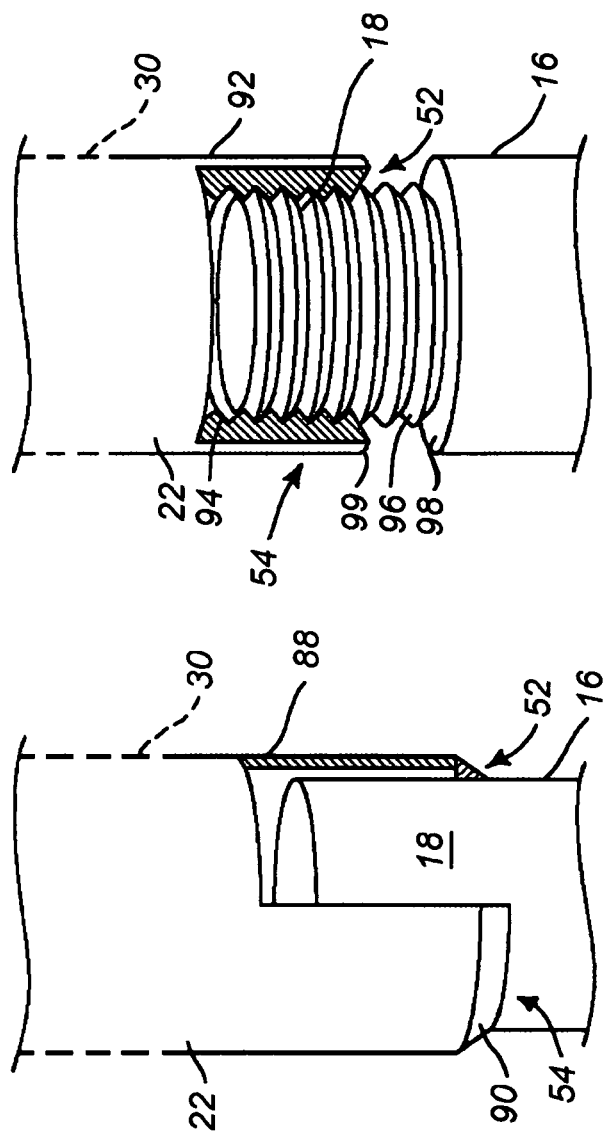

SUPPORT LEG

This application is a Continuation-in-part and claims priority benefit of parent U.S. patent application Ser. No. 10/802, 408, filed Mar. 17, 2004 now U.S. Pat. No. 7,959,116 issued to Jeffrey D. Carnevali on Jun. 14, 2011, the complete disclosure of which is incorporated herein by reference.

FIELD OF THE INVENTION

The present invention relates generally to pole supports for providing lateral support for free standing poles, and in particular to universal multidirectional pole support apparatus.

BACKGROUND OF THE INVENTION

Many free standing poles and posts would benefit from lateral support. However, known lateral support apparatus are fixed length for use in a specific situation. Known variable length lateral support apparatus utilize a two-part support rod that adjusts either by telescoping one inside the other, or bolting the two parts together in different configurations. The fixed length design is limited to specific applications, while the more general purpose variable length design is bulky and awkward.

Furthermore, attachment means at the ends of known lateral support apparatus are limited to specific angular and rotational orientations relative to the support rod there between. Additionally, the attachment means are generally limited to a single specific type of attachment. Known lateral support apparatus fail to provide true universality of application.

SUMMARY OF THE INVENTION

The present invention is a novel universal support apparatus includes a permanently bendable support rod having one of a pair of anchors secured to each end, and a pair of fasteners that cooperate with the anchors for connecting the support rod between an external structure, such as but not limited to a free standing pole or post, and an adjacent fixed structure such as a floor or wall. Each anchor is formed of a substantially rigid foot having inner and outer arced surfaces, an aperture formed through the foot, and a rod connector structured for securing the anchor to one end of the support rod. The pair of fasteners are each operable through the aperture of the foot of one of the anchors.

According to one aspect of the novel universal support apparatus, the ends of the support rod are a slip fit with the rod connectors in the anchors and are rotatable therein until secured by gripping means. Furthermore, the support rod is composed of a solitary nonextensible member of unitary single-piece construction having a substantially uniformly solid cross-section extended substantially continuously between opposing first and second end portions, and is substantially independently permanently bendable in three dimensions along substantially an entire length thereof between the end portions secured to the rod connectors of the anchors.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 2-5 are different views that illustrate the novel support leg coupled for providing lateral support to a free standing pole or post;

FIG. 10 is a detailed view of one embodiment of a rod connector portion of the novel anchor;

FIG. 11 illustrates one alternative embodiment of the rod connector;

FIG. 12 illustrates another alternative embodiment of the rod connector; and

FIG. 13 illustrates yet another alternative embodiment of the rod connector.

DETAILED DESCRIPTION OF PREFERRED EMBODIMENT

In the Figures, like numerals indicate like elements.

Figure 1:
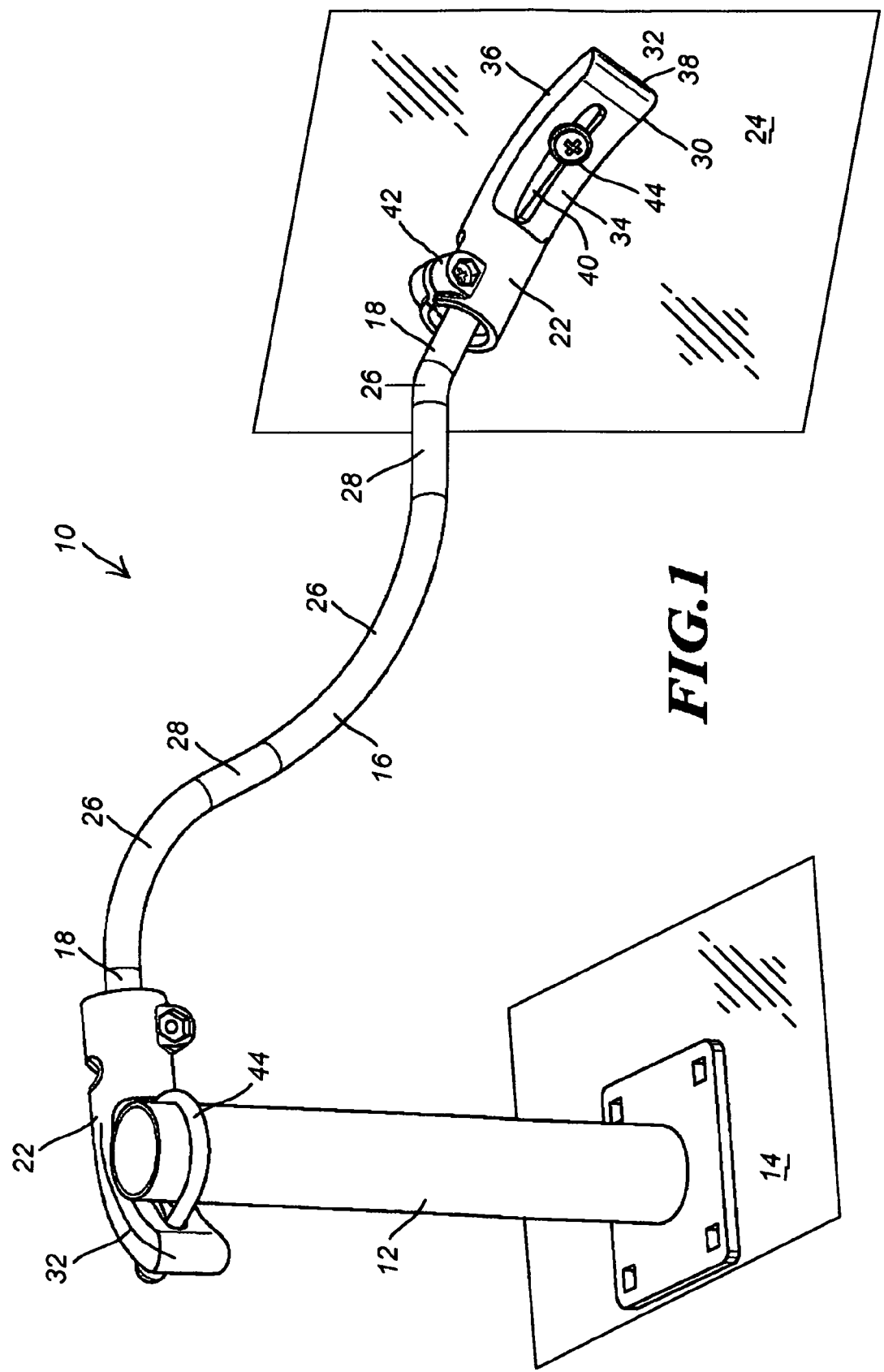
FIG. 1 illustrates a novel support leg for providing lateral support to a free standing pole or post.

FIG. 1 illustrates a support leg 10 for providing lateral support to an external structure 12, such as but not limited to a free standing pole or post. By example and without limitation, structure 12 is a pole or post that is mounted free standing in an automobile or other vehicle 14. Support leg 10 is formed of a permanently bendable support arm 16 anchored at either end 18 by a pair of anchors 22. By example and without limitation, support leg 10 provides lateral support to free standing structure 12 by anchoring to an adjacent surface 24 of vehicle 14, such as a floor, wall or other structural portion of vehicle 14.

Permanently bendable support arm 16 is of the type disclosed in issued U.S. Pat. No. 7,481,404, and U.S. Pat. No. 7,959,116, the complete disclosures of which are all incorporated herein by reference. Accordingly, permanently bendable support arm 16 is composed, by example and without limitation, of a solitary nonextensible elongated metal rod of single-piece construction having a substantially uniformly solid cross-section extended substantially continuously between opposing end portions 18 and being independently permanently bendable in three orthogonal dimensions along substantially an entire length between end portions 18. Support arm 16 is formed of permanently bendable aluminum or aluminum alloy with a substantially constant diameter of about ½ inch, but at least in the range of about ⅛ inch, ¼ inch or ⅜ inch to about 1 inch. Support arm 16 is alternatively realized in steel, copper, permanently bendable copper alloys or another permanently bendable metal or rigid plastic material without limiting the practice of the invention. Support arm 16 is not limited to rods having round cross-sections; rather, support arm 16 is alternatively realized having a square, rectangular, hexagonal, octagonal or other alternative cross-section. By example and without limitation, permanently bendable support arm 16 is illustrated as having different contiguous and interconnected bent portions 26 and substantially straight portions 28 permanently formed along its elongated length between end portions 18.

Anchors 22 include a substantially rigid part circular curved foot 30 formed along a curving arc 32 and defining inner and outer substantially mutually concentric curved or arced surfaces 34, 36. Outer curved surface 36 is offset from inner curved surface 34 by a substantially continuous solid thickness of material 38. One or more apertures 40 are formed through the substantially continuous solid thickness of material 38 substantially along the curve of foot 30. According to one embodiment, aperture 40 is a single curved slot through the thickness of material 38 and extended along curving arc 32 of curved foot 30. A rod connector 42 is structured for securing support arm 16 to foot 30. By example and without limitation, rod connector 42 is extended from one end of arc 32 of curved foot 30 and is optionally substantially tangent therewith. Respective rod connectors 42 secure the pair of anchors 22 to end portions 18 of support arm 16.

A fastener 44 is structured for cooperating with aperture 40 for securing external structure 12 to one of inner arced surface 34 of one anchor 22, while a different fastener 44 is structured for cooperating with aperture 40 for securing outer arced surface 36 of a different anchor 22 to adjacent portion 24 of vehicle 14.

Figure 2:
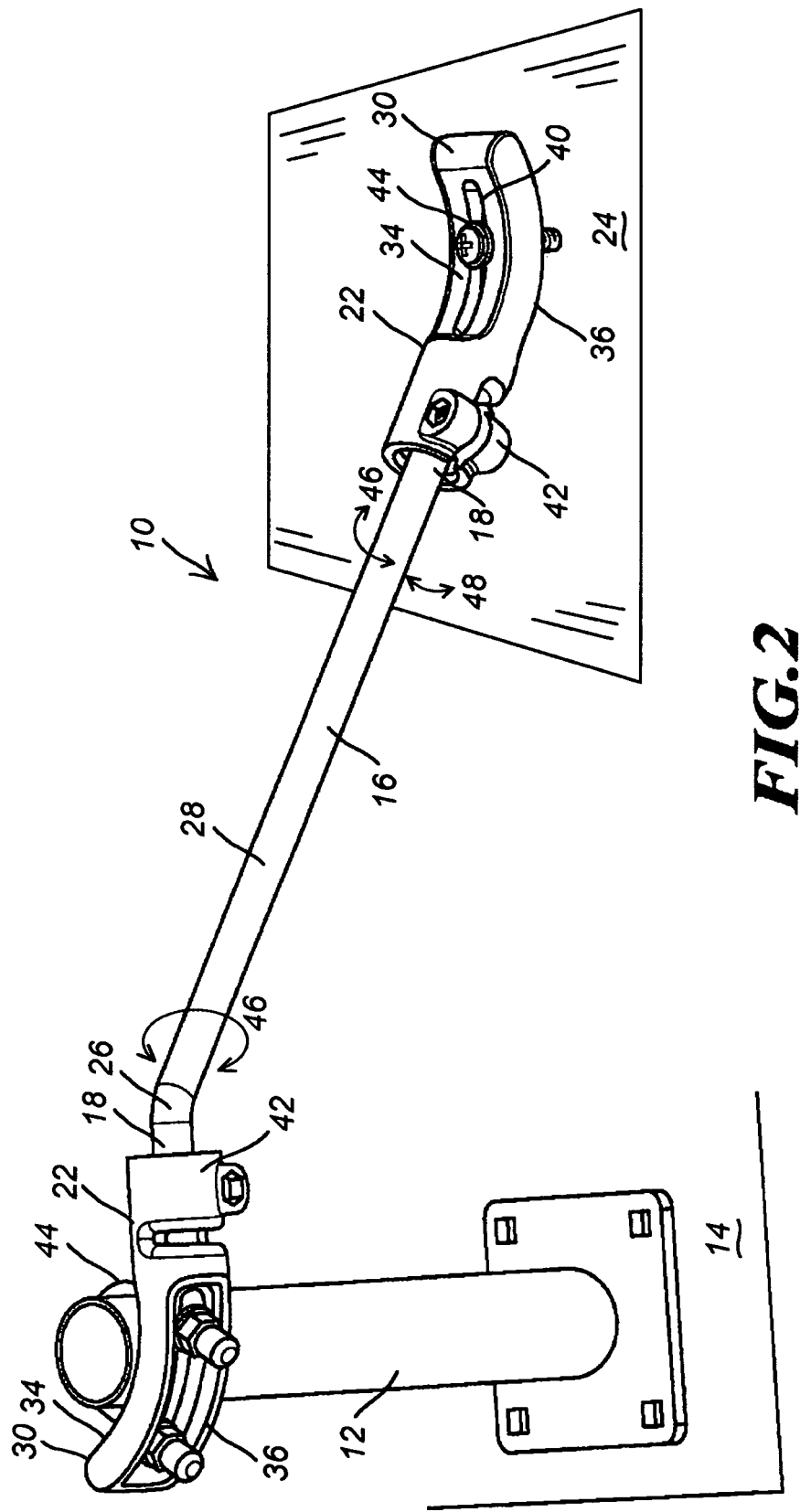
Figure 3:
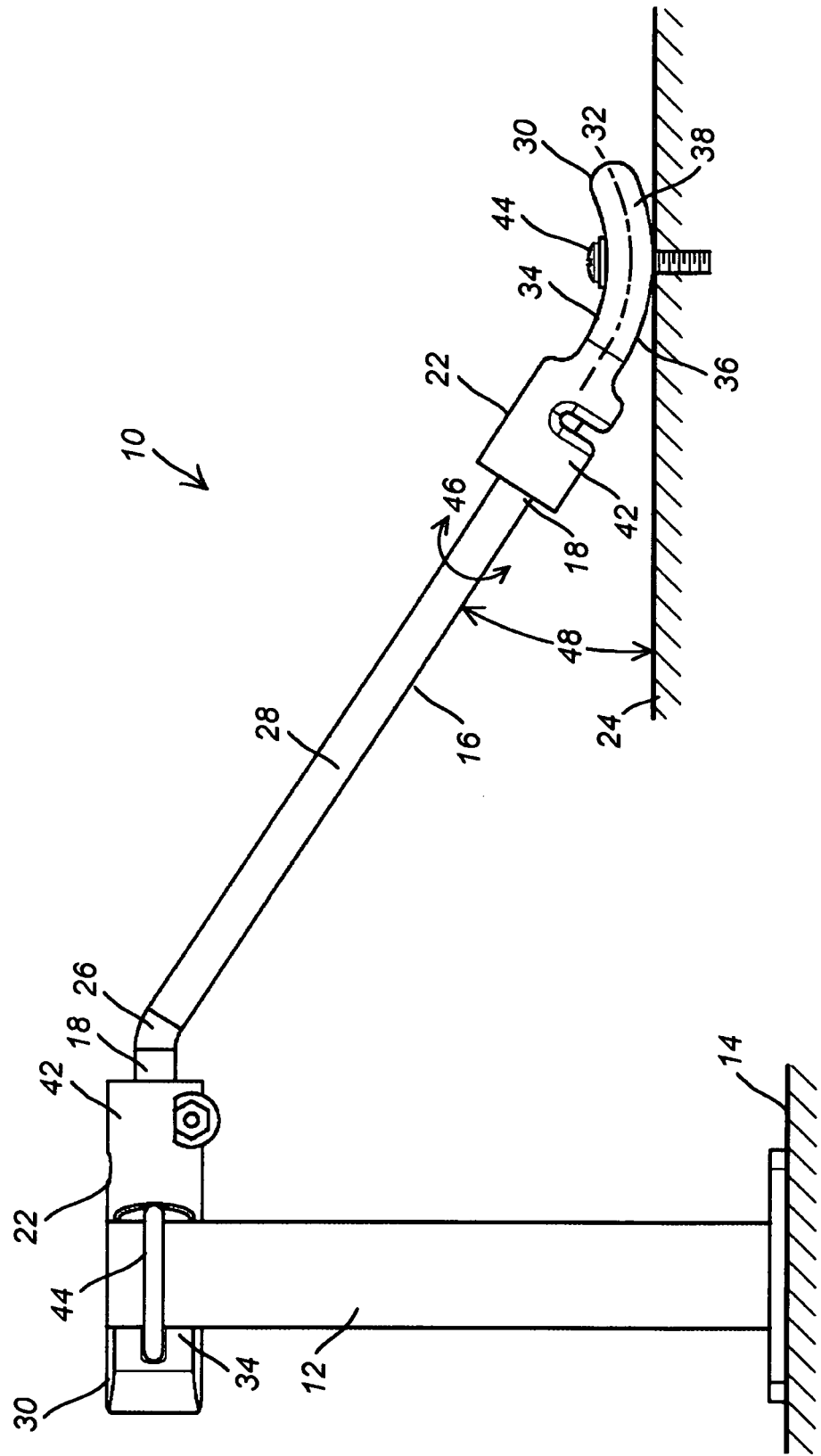

FIGS. 2-5 are different views that illustrate support leg 10 coupled for providing lateral support to free standing external structure 12. As illustrated, anchors 22 are rotatable (arrow 46) about respective end portions 18 of support arm 16. Anchors 22 are, therefore, positionable on any adjacent inclined vehicle surface, as well as any horizontal floor or upright wall surface 24. For example, FIGS. 2 and 5 illustrate anchor 22 (right) mounted on an inclined adjacent surface 24 of vehicle 14. Furthermore, curvature of arced surfaces 34, 36 ensures that foot 30 of anchors 22 is securable to adjacent surface 24 with respective rod connectors 42 extended within a range of angles 48 that permit locating anchor 22 in tight spaces, and minimize bending of arm 16.

Figure 6:
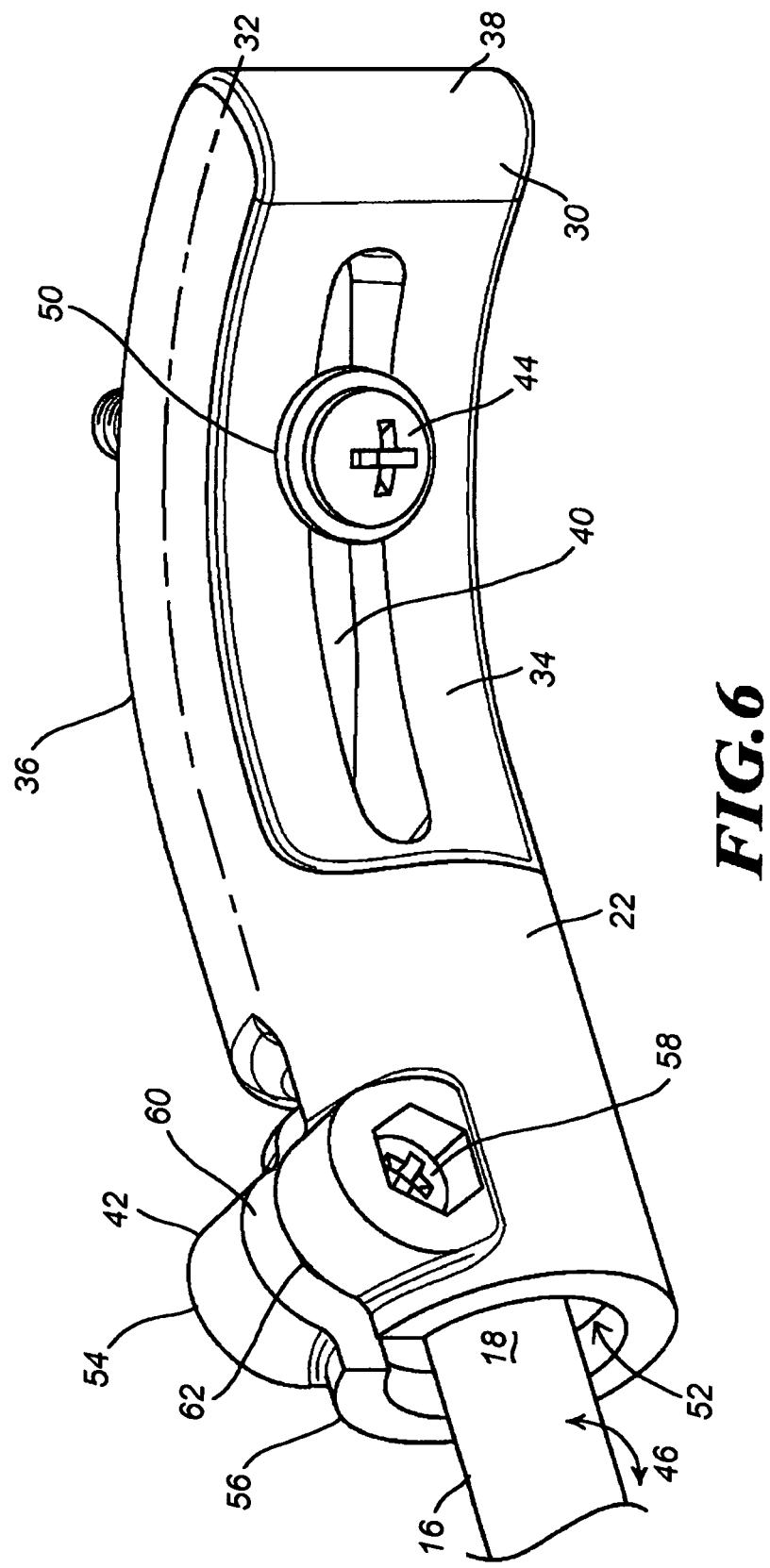
FIG. 6 is a view of a novel anchor of the novel support leg looking at an inner arced surface thereof.

FIG. 6 is a view of anchor 22 looking at inner arced surface 34. Aperture 40 is a single curved slot through the thickness of material 38 and extended along curving arc 32 of curved foot 30 and is sized to receive there through cooperating fastener 44. Here, fastener 44 is shown as a conventional threaded screw or bolt. Washer 50 is optionally provided between fastener 44 and foot 30.

Rod connector 42 is shown as being extended substantially tangentially from arc 32 of curved foot 30. By example and without limitation, rod connector 42 is shown as having a longitudinal cavity 52 that is sized to slidingly receive a short distance thereinto either of end portions 18 of support arm 16, and gripping means 54 for gripping arm end portions 18. For example, gripping means 54 is a threaded gripping means embodied as a clamp joint formed of a split collar 56 tightened by a threaded fastener 58 operating across a split 60 and applied to an internally threaded aperture 62. Tightening of fastener 58 closes split 60 in collar 56 and squeezes cavity 52 about end portions 18 of support arm 16. Thereafter, end portions 18 of support arm 16 cannot be slidingly removed from cavity 52 and are rendered nonrotatable.

According to one embodiment, collar 56 having gripping means 54 formed therein is formed integrally with curved foot 30 of anchor 22, as by molding, casting or machining. Support arm 16 is mated directly to anchor 22 by rod connector 42. Accordingly, longitudinal cavity 52 is formed directly in anchor 22 through rod connector 42.

Figure 7:
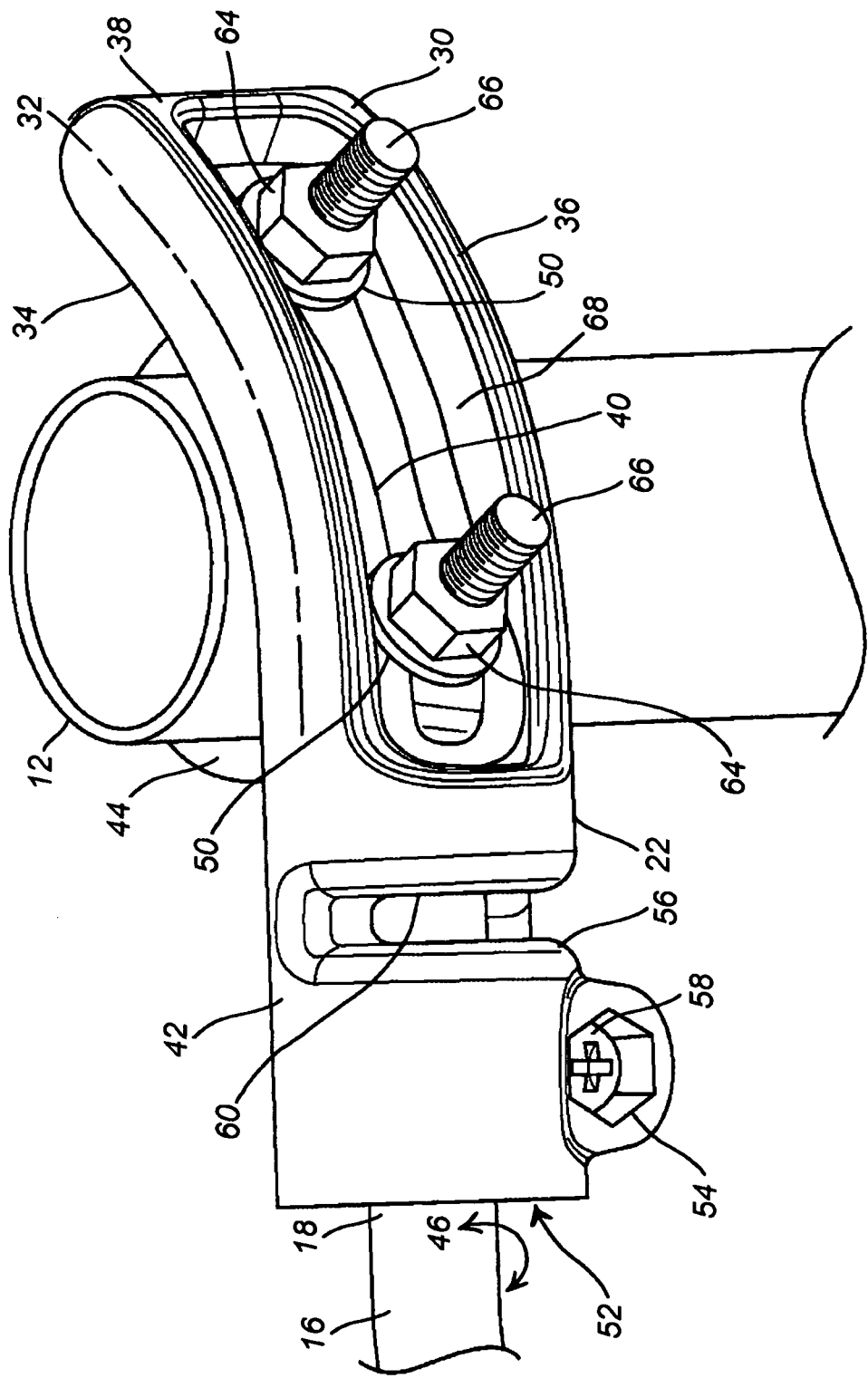
FIG. 7 is a view of the novel anchor looking at an outer arced surface thereof.

FIG. 7 is a view of anchor 22 looking at outer arced surface 36. Slot aperture 40 is extended along curving arc 32 of curved foot 30 for receiving there through cooperating fastener 44. Here, fastener 44 is shown as a conventional U-bolt with a pair of nuts 64 threaded onto threaded shaft ends 66. Washers 50 are optionally provided between nuts 64 and foot 30. Additionally, a portion 68 of curved foot 30 is recessed from outer arced surface 36 around slot aperture 40 so that shaft ends 66 of U-bolt fastener 44 do not extend excessively beyond outer arced surface 36.

Figure 8:
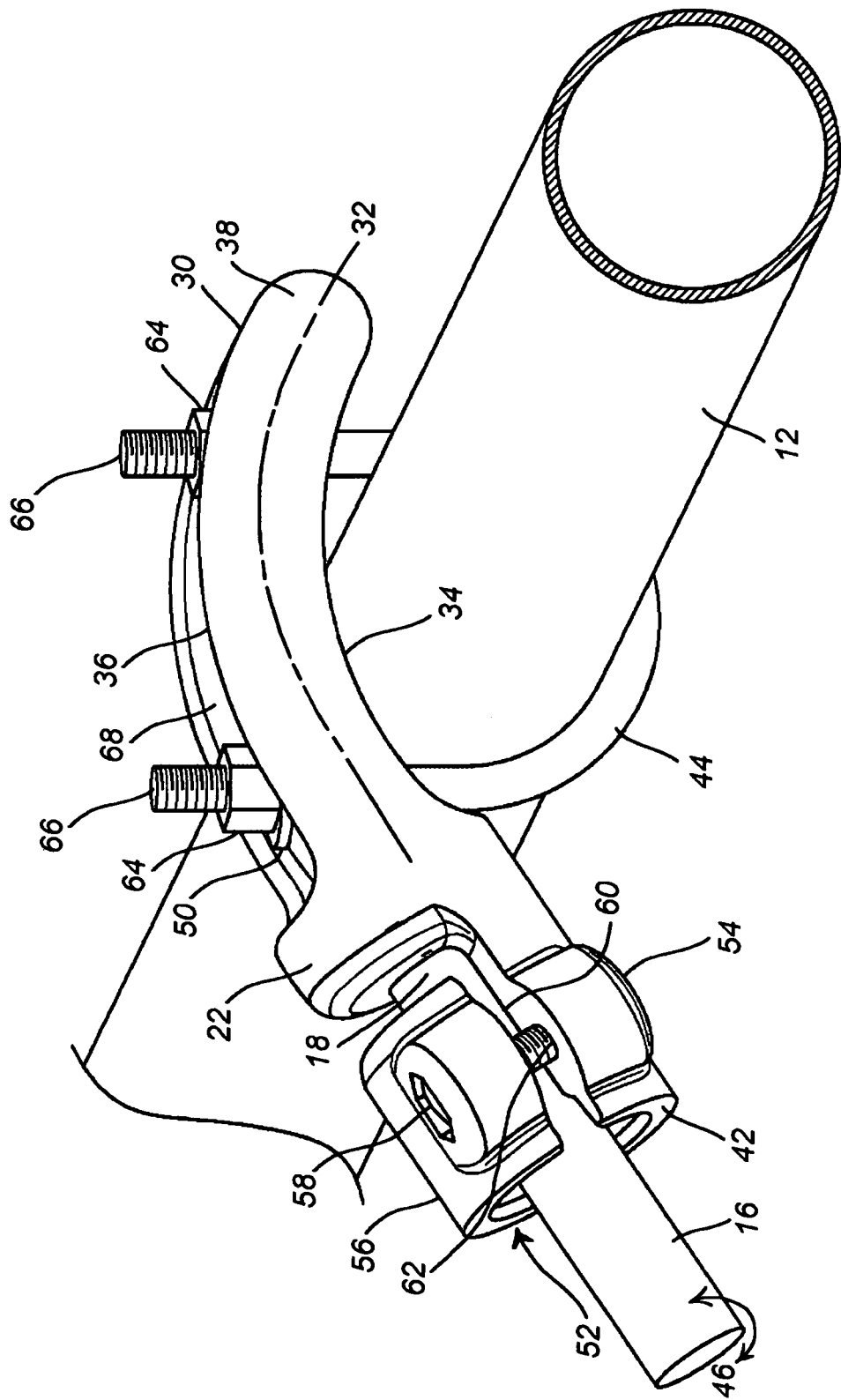
FIG. 8 is a perspective view of the novel anchor looking at a solid thickness of material between the inner and outer substantially mutually concentric curved or arced surfaces thereof.

FIG. 8 is a perspective view of anchor 22 looking at thickness of material 38 between inner and outer substantially mutually concentric curved or arced surfaces 34, 36.

Figure 9:
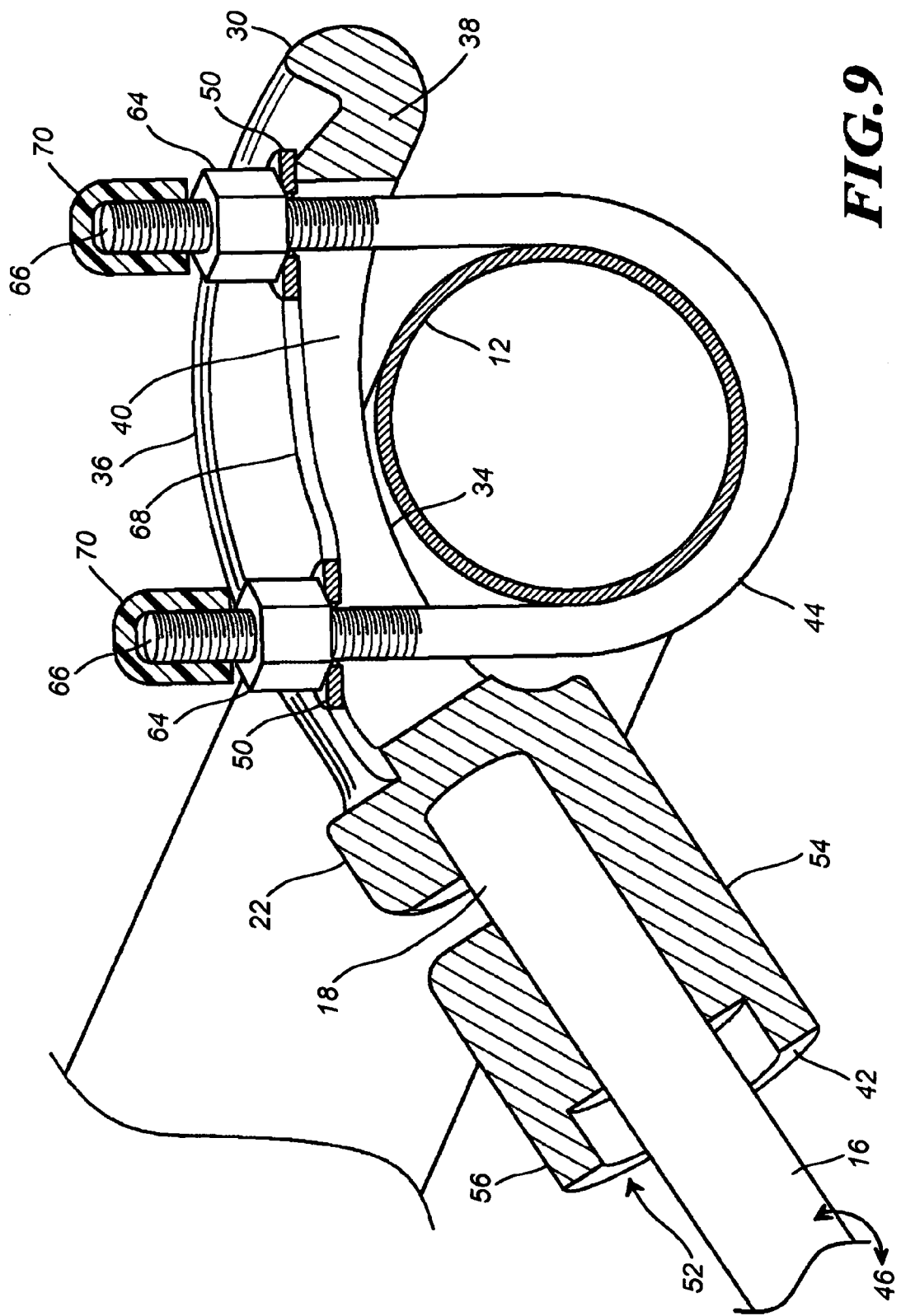
FIG. 9 is a cross-section view of the novel anchor.

FIG. 9 shows fastener 44 is shown as a conventional U-bolt fitted around external structure 12, such as but not limited to a free standing pole or post. Nuts 64 are threaded onto threaded shaft ends 66. Washers 50 are optionally provided between nuts 64 and foot 30. Aperture 40 is a single curved slot through the thickness of material 38 so as to accept fastener 44 embodied as either U-bolt (shown here) or screw (shown in FIG. 6). Here, washers 50 and nuts 64 are recessed into recessed portion 68 of curved foot 30. Additionally, protective caps 70 are shown fitted over shaft ends 66.

End portion 18 of support arm 16 is shown slidably received into cavity 52 of rod connector 42. Arm end portion 18 is rotatable (arrow 46) in cavity 52 until secured by tightening of gripping means 54.

FIG. 10 is a detailed view of rod connector 42 of anchor 22. Here, rod connector 42 includes split collar 56 forming therein internal cylindrical cavity 52 truncated by foot 30. Truncated cylindrical cavity 52 is sized to slip over end portion 18 of support arm 16. Split 60 is substantially parallel with longitudinal cavity 52, whereby a longitudinal opening is formed. A pair of bosses 72, 74 cooperate with threaded fastener 58 as gripping means 54. Near boss 72 is pierced with a clearance aperture 76 for fastener 58, while far boss 74 is provided with internally threaded aperture 62 that mates with fastener 58. Threaded fastener 58 operates between clearance aperture 76 and threaded aperture 62 for closing split 60 by drawing together bosses 72, 74, which tightens cylindrical cavity 52 about end portion 18 for securing support arm 16.

FIG. 11 illustrates one alternative embodiment of rod connector 42 of anchor 22 having an alternative tubular female collar 78 forming therein truncated internal cylindrical cavity 52 which bottoms against foot 30. Truncated cylindrical cavity 52 is sized to slip over end portion 18 of the support arm 16. Gripping means 54 is provide by one or more of threaded fasteners 80 or set screws operating through one or more bosses 82 at one or more positions spaced peripherally around tubular female collar 78. Respective internally threaded apertures 84 pierce bosses 82 and adjacent side wall 86 of tubular collar 78. When side wall 86 is sufficiently thick, bosses 82 are optionally eliminated, and threaded apertures 84 pierce side wall 86 directly. One or more of threaded fasteners 58 operating through internally threaded apertures 84 engage end portion 18 of support arm 16 and thereby operate as gripping means 54.

FIG. 12 illustrates another alternative embodiment of rod connector 42 of anchor 22 having an alternative tubular female collar 88 forming therein truncated internal cylindrical cavity 52 which bottoms against foot 30. Truncated cylindrical cavity 52 is sized to slip over end portion 18 of support arm 16. Gripping means 54 is provide by a weld or other fusion joint 90 formed at least intermittently between end portion 18 of support arm 16 and collar 88.

FIG. 13 illustrates another alternative embodiment of rod connector 42 of anchor 22 having an alternative tubular female collar 92 forming therein truncated internal cylindrical cavity 52 which bottoms against foot 30 and is sized to slip over end portion 18 of support arm 16. Gripping means 54 is provide by internal threads 94 provided within cavity 52 and structured to match external threads 96 provided on end portion 18 of support arm 16. Matching internal and external threads 94, 96 cooperate to provide a threaded joint that operates as gripping means 54 between end portion 18 of support arm 16 and female collar 92 of rod connector 42. End portion 18 of support arm 16 is shorter than threads 96 such that a shoulder 98 is provided at a base of threads 96. Shoulder 98 operates as a stop against which a lip 99 of cylindrical cavity 52 is seated when internal threads 94 and external threads 96 are fully engaged.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A support apparatus, comprising:
    a first anchor, comprising:
        a substantially rigid foot formed of one piece comprising an inner arced surface formed on a first side thereof and an outer arced surface offset therefrom on a second side thereof substantially opposite of the first side, wherein the inner and outer arced surfaces are further substantially concentric and extend substantially a length of the foot,
        an aperture formed substantially crosswise through a curve of the substantially concentric inner and outer arced surfaces of the foot, and
        a rod connector structured for securing the foot to a support rod; and
    a fastener operable through the aperture; and
    further comprising a second anchor.

2. The apparatus of claim 1 wherein the aperture further comprises a fastener clearance aperture.

3. The apparatus of claim 1 wherein the rod connector further comprises a cavity sized to receive thereinto a portion of the support rod, and a means for gripping the support rod.

4. The apparatus of claim 1, further comprising a support rod.

5. The apparatus of claim 4 wherein the support rod further comprises a permanently bendable rod extended between opposing end portions each structured to be coupled to the rod connector of a respective one of the anchors.

6. The apparatus of claim 5 wherein the rod connector further comprises a cavity formed therein; and
    wherein the opposing end portions of the support rod are received into the cavity of a respective one of the anchors and secured therein by the gripping means.

7. The apparatus of claim 6 wherein the cavity formed in the rod connector further comprises a cavity sized to slidingly receive thereinto one of the opposing end portions of the support rod.

8. The apparatus of claim 1 wherein the aperture formed substantially crosswise through a curve of the substantially concentric inner and outer arced surfaces of the foot is further formed along a radius of curvature of the substantially concentric arced surfaces.

9. The apparatus of claim 1, wherein the second anchor is substantially similar to the first anchor.

10. A support apparatus, comprising:
    a first anchor, comprising:
        a substantially rigid part-circular curved foot formed of one piece comprising inner and outer substantially concentric arced surfaces with the outer arced surface being on a first side thereof offset from the inner arced surface on a second opposite side thereof by a substantially continuous solid thickness of material, the inner and outer arced surfaces extending substantially an entire length of the foot,
        one or more apertures formed along a radius of curvature of the part-circular curved foot and extended through the substantially continuous solid thickness of material and the inner and outer arced surfaces, and
        a rod connector extended from an end of the foot and structured for securing a support rod;
    a fastener cooperating with the one or more apertures for securing an external structure to one of the inner and outer arced surfaces of the foot; and
    a second anchor and a second fastener, each of the fasteners cooperating with the one or more apertures of one of the anchors.

11. The apparatus of claim 10 wherein the one or more apertures further comprises a slot.

12. The apparatus of claim 11 wherein the rod connector further comprises a female cavity projected along the concentric arced surfaces of the part-circular curved foot and sized to slidingly receive a rod thereinto.

13. The apparatus of claim 10, further comprising a support rod having opposing end portions each slidingly received into the cavity formed by the rod connector of one of the anchors.

14. The apparatus of claim 13 wherein the support rod is further limited to only a solitary nonextensible metal rod of single-piece construction having a substantially uniformly solid cross-section extended substantially continuously between the opposing end portions.

15. The apparatus of claim 10, wherein the first anchor and the second anchor further comprise a pair of substantially identical anchors.

16. A support apparatus, comprising:
    a pair of anchors, each anchor comprising:
        a substantially rigid foot formed of one continuous piece comprising opposing inner and outer arced surfaces, wherein the outer arced surface is offset from inner arced surface by a substantially continuous solid thickness of material, the inner and outer arced surfaces extending substantially an entire length of the foot,
        an aperture formed between the inner and outer arced surfaces of the foot and extended through the substantially continuous solid thickness of material thereof, and
        a rod connector extended from an end of the foot;
    a pair of fasteners each operable through the aperture of the foot of one of the anchors; and
    a support rod composed of a solitary nonextensible member of unitary single-piece construction having a substantially uniformly solid cross-section extended substantially continuously between opposing first and second end portions and being substantially independently permanently bendable in three dimensions along substantially an entire length thereof between the first and second end portions, each of the end portions being secured to the rod connector of one of the pair of anchors.

17. The apparatus of claim 16 wherein the rod connector of each of the pair of anchors further comprises a means for clamping the end portions of the support rod.

18. The apparatus of claim 16 wherein the rod connector of each anchor further comprises a cavity formed therein; and
    wherein at least one of the first and second end portions of the support rod is further sized to slidingly received into the cavity of the rod connector.

19. The apparatus of claim 18 wherein the rod connector further comprises means for gripping the end portions of the support rod.

20. The apparatus of claim 19 wherein the aperture formed through the foot of each anchor further comprises a slot extended along a curvature of the inner and outer arced surfaces of the foot.

21. The apparatus of claim 20 wherein one of the pair of fasteners further comprises a U-bolt.

* * * * *